United States Patent
Chen et al.

(10) Patent No.: US 8,354,870 B2
(45) Date of Patent: Jan. 15, 2013

(54) SWITCHING CLOCK SOURCES

(75) Inventors: Hao Qiong Chen, Shanghai (CN); Wen Zhu, Shanghai (CN)

(73) Assignee: LSI Corporation, Milpitas, CA (US)

( * ) Notice: Subject to any disclaimer, the term of this patent is extended or adjusted under 35 U.S.C. 154(b) by 242 days.

(21) Appl. No.: 12/828,460

(22) Filed: Jul. 1, 2010

(65) Prior Publication Data

US 2011/0298502 A1   Dec. 8, 2011

(30) Foreign Application Priority Data

Jun. 7, 2010   (CN) .................. XW2010 0 00208

(51) Int. Cl.
*H03K 3/00* (2006.01)
(52) U.S. Cl. ......................................... 327/298; 326/94
(58) Field of Classification Search .................. 327/291, 327/298, 299; 326/94; 375/354, 355, 357
See application file for complete search history.

(56) References Cited

U.S. PATENT DOCUMENTS

| | | | |
|---|---|---|---|
| 6,906,555 B2 * | 6/2005 | Ma ................................ | 326/94 |
| 7,042,263 B1 | 5/2006 | Johnson et al. | |
| 7,242,230 B2 | 7/2007 | Boyko et al. | |
| 7,262,644 B2 | 8/2007 | Lin | |
| 7,401,243 B2 | 7/2008 | Knepper et al. | |
| 2002/0063588 A1 | 5/2002 | Page et al. | |
| 2005/0184773 A1 | 8/2005 | Boyko et al. | |
| 2006/0288249 A1 | 12/2006 | Knepper et al. | |

* cited by examiner

*Primary Examiner* — Lincoln Donovan
*Assistant Examiner* — Diana J Cheng
(74) *Attorney, Agent, or Firm* — Luedeka Neely Group, P.C.

(57) ABSTRACT

A clock-switching circuit having at least two inputs for receiving at least two different clock sources, an output for providing a selected one of the clock sources, and a switch for selecting the one of the inputs to provide on the output, the switch including elements that, prevent the providing of a truncated version of any of the clock sources on the output, always provide a clock signal on the output, and always maintain phase alignment and pulse ratio of the clock sources on the output.

2 Claims, 3 Drawing Sheets

SWITCHING CLOCK SOURCES

FIELD

This invention relates to the field of integrated circuits. More particularly, this invention relates to an integrated circuit for switching between two clock sources without producing a glitch on the output clock line and while maintaining an exact pulse number ratio and phase alignment for the divided clocks.

INTRODUCTION

Low power consumption and high performance are desired features in serializer-deserializer and other such systems. To provide the high performance that is needed, a phase lock loop is typically used as the system clock generator, which transmits data with very tight jitter performance. Unavoidably, the phase lock loop will consume a considerable amount of power when running at several gigahertz. However, data traffic is not always active, and there are often long periods of time when the system only needs to listen or transmit at relatively low frequencies in order to maintain the link or stand by. During these times, not only can the system clock frequency be substantially reduced, but the jitter requirement is also much less. To achieve the goal of low power consumption during such periods, a low frequency source such as a digital phase lock loop is implemented. A clock multiplexer (MUX) block is typically used to switch between these two clock sources.

In a simple implementation of a clock MUX, a select signal is used to select the clock source. For example, when the select line high, then clock one is selected, and when the select line is low, then clock two is selected. However, when the select line is toggled between the synchronized rising and falling of the two clock signals, a small width pulse, called a glitch, may be generated on the output line. The glitch can also be thought of as a truncated version of one or the other of the input clocks. In other words, the glitch is any pulse on the output line that is not a wholly-formed pulse of one of the input clocks. In an ideal switching circuit, the perfectly-formed last pulse of a preceding first clock signal is followed by a perfectly-formed first pulse of a succeeding second clock signal. A glitch pulse in the system clock can cause severe problems in modern digital systems.

In a typical serializer-deserializer system there are several synchronous clocks that are divided down from one common source, which are used for multiple data rates. After being multiplexed, such clocks typically required a phase alignment to maintain the exact pulse number ratio. If these multiple clocks are to be multiplexed, and it is required to concurrently maintain phase alignment and pulse ratio, the circuit becomes more complicated to implement than the simple case described above.

One existing solution uses a select signal such that when clock one is to be selected, clock 2 is stopped first after one rising edge and one falling edge, then after one rising edge and one falling edge of clock one, clock one is enabled and output. An AND operation is executed after the falling edge of clock one, and an OR operation is executed after clock two is stopped so that there is no glitch on the output clock signal.

The problem with this method is that both clocks must be active at the time that the clocks are multiplexed. If clock two is stopped at the time that the select signal is toggled, then clock one will be stopped and there will be no signal on the output clock.

What is needed, therefore, is a system that reduces problems such as those described above, at least in part.

SUMMARY OF THE CLAIMS

The above and other needs are met by a clock-switching circuit having at least two inputs for receiving at least two different clock sources, an output for providing a selected one of the clock sources, and a switch for selecting the one of the inputs to provide on the output, the switch including elements that, prevent the providing of a truncated version of any of the clock sources on the output, always provide a clock signal on the output, and always maintain phase alignment and pulse ratio of the clock sources on the output.

According to another aspect of the invention there is described a clock-switching circuit having at least two inputs for receiving at least two different clock sources, an output for providing a selected one of the clock sources, a first switch for receiving and selecting between relatively lower frequency clock sources on the inputs, and for generating control signals for selecting between relatively higher frequency clocks on the inputs, the first switch including elements that prevent the providing of a truncated version of any of the clock sources on the output, always provide a clock signal on the output, and always maintain phase alignment and pulse ratio of the clock sources on the output, and at least one second switch for receiving the control signals from the first switch, and for receiving and selecting between the higher frequency clock sources on the inputs, based at least in part upon the control signals received from the first switch.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The various embodiments of the present invention as described herein multiplex multiple synchronous clocks from two clock sources with glitch-free phase alignment and exact pulse ratio requirements.

Figure 1:
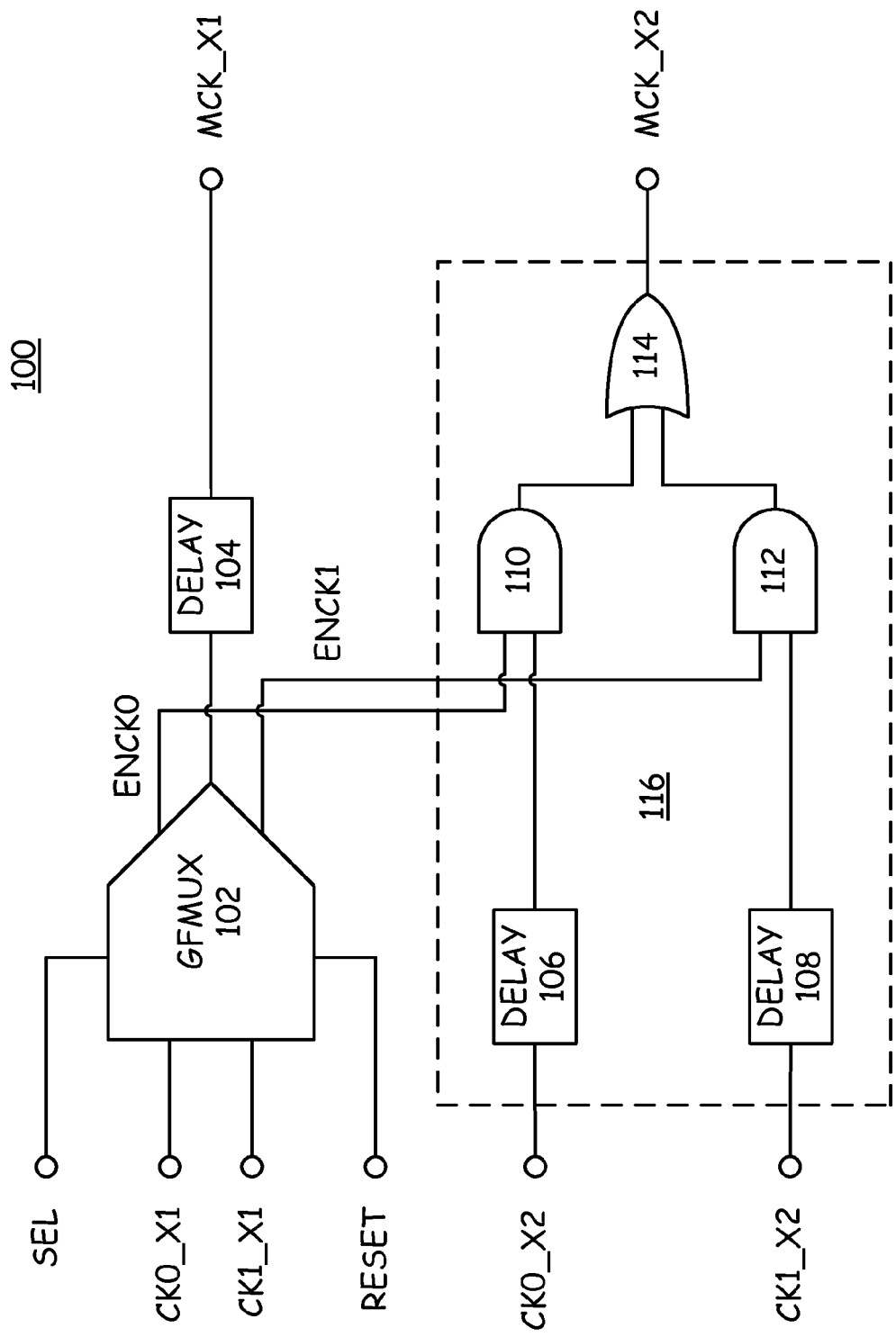
FIG. 1 is a circuit diagram of a clock switching circuit including a MUX, according to an embodiment of the present invention.

With reference now to FIG. 1, there is depicted a switching circuit 100, including a first switch 102, having as inputs a select line SEL, a first relatively slower clock source CK0_X1, a second relatively slower clock source CK1_X1, and reset line RESET. The first switch 102 outputs first and second clock enable lines ENCK0 and ENCK1, and a first output clock line MCK-X1 through a delay 104.

A second switch 116 has as inputs a first relatively faster clock source CK0_X2 that is a multiple of CK1_X1, a second relatively faster clock source CK1_X2 that is a multiple of CK1_X1. The two clock sources are each input through two separate delays 106 and 108, the outputs of which are input to two separate AND gates 110 and 112, which also receive as inputs the two enable lines ENCK0 and ENCK1 respectively.

The outputs of the two AND gates 110 and 112 are input to an OR gate 114, the output of which is a second output clock line MCK-X2.

Figure 2:
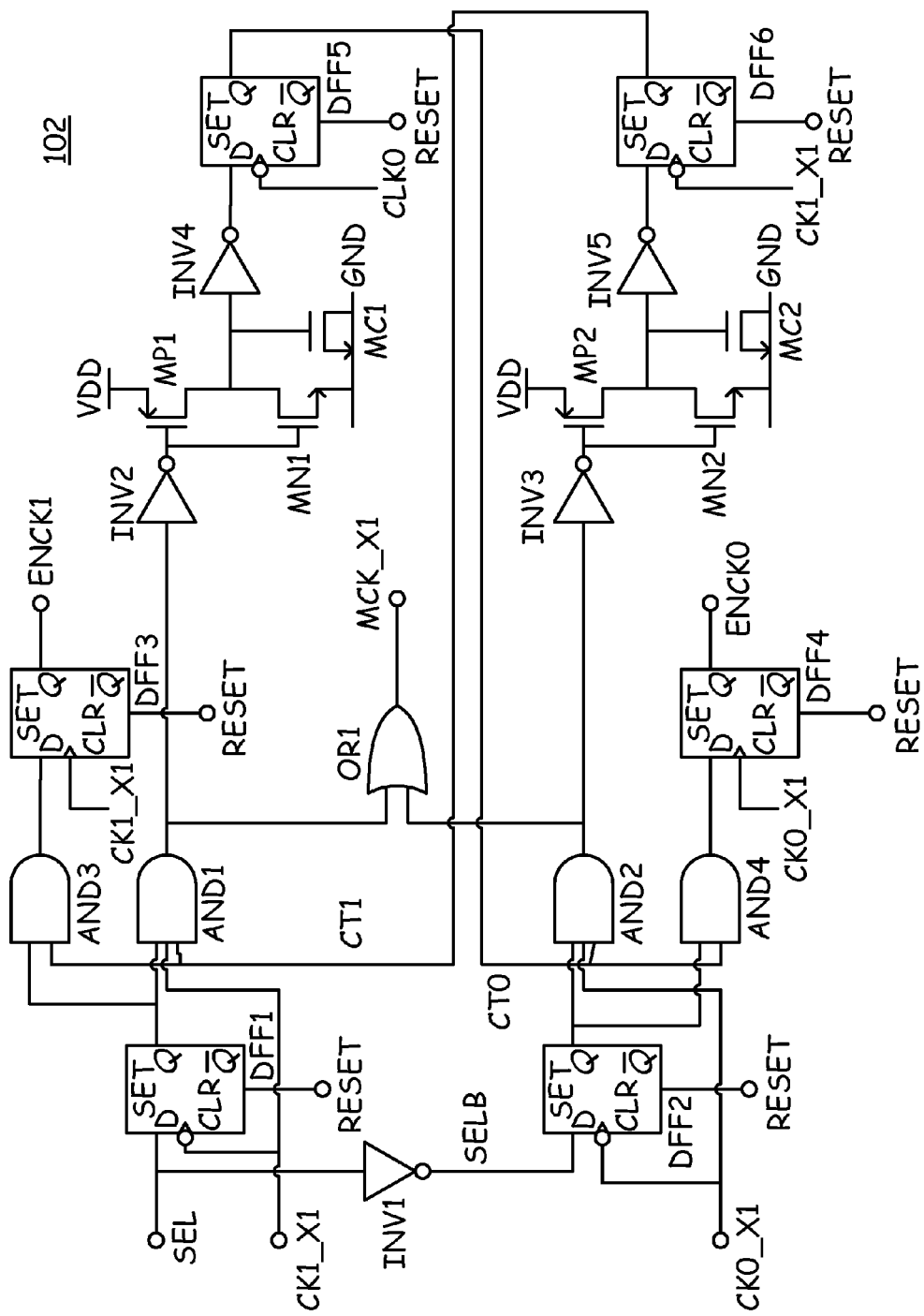
FIG. 2 is a more detailed circuit diagram of the MUX of FIG. 1, according to an embodiment of the present invention.

With reference now to FIG. 2, there is depicted a more detailed embodiment of the first MUX 102. The first switch 102 can be divided into three logical sections, which are (1) a multiplexing section, (2) a control signal generation section, and (3) an enable signal generation section.

The multiplexing section includes a first delay flip flop DFF1 that receives as input SEL, CK1_X1, and a second delay flip flop DFF2 that receives as input SEL through a first inverter INV1, CK0_X1, and RESET. DFF1 and DFF2 output respectively to AND gates AND1 and AND2, which also receive as input CK0_X1 and CK1_X1, respectively, and provide output to an OR gate OR1, the output of which is MCK-X1.

The control signal generation section includes a second inverter INV2 that receives as input the output from AND1 and a third inverter INV3 that receives as input the output from AND2. The output of INV2 controls the gate electrodes of both first n-channel MOS transistor MN1 and first p-channel MOS transistor MP1. The source electrode of MP1 is VDD, and the drain electrode of MN1 is the drain electrode of a first CMOS transistor MC1. The source electrode of MC1 is logical ground GND. The drain electrode of MP1 and the source electrode of MN1 are tied together and input to both the gate electrode of MC1 and a fourth inverter INV4. A fifth delay flip flop DFF5 receives as input the output of INV4, CK0_X1, and RESET, and provides as output a signal CT0.

Similarly, the output of INV3 controls the gate electrodes of both second n-channel MOS transistor MN2 and second p-channel MOS transistor MP2. The source electrode of MP2 is VDD, and the drain electrode of MN2 is the drain electrode of a second CMOS transistor MC2. The source electrode of MC2 is GND. The drain electrode of MP2 and the source electrode of MN2 are tied together and input to both the gate electrode of MC2 and a fifth inverter INV5. A sixth delay flip flop DFF6 receives as input the output of INV5, CK1_X1, and RESET, and provides as output a signal CT1.

The enable signal generation section includes a third AND gate AND3, which receives as input the output from DFF1 and CT1. A fourth AND gate AND4 receives as input the output from DFF2 and CT0. A third delay flip flop receives as input the output from AND3, CK1_X1, and RESET, and provides as output ENCK1. Similarly, a fourth delay flip flop DFF4 receives as input the output of AND4, CK0_X1, and RESET, and provides as output ENCK0.

The first MUX 102 multiplexes the two relatively lowest frequency clocks and generates two enable signals ENCK0 and ENCK1 that multiplex the relatively higher frequency clocks. The enable signals ENCK0 and ENCK1 are toggled at the rising edge of the lowest frequency clock. Because the input clocks on the MUX 102 are synchronous, and the delay 104 is inserted on the output clock line of MUX 102, one of the enable signal on either ENCK0 or ENCK1 toggles to high earlier than the rising edge of the clock, which ensures that no glitch is generated after the AND operation.

Because the disable signal on either ENCK0 or ENCK1 changes to low earlier than the enable signal, the MUX 116 for the higher frequency clocks is also a glitch-free MUX. Because all the clocks are multiplexed before the rising edge of the lowest frequency clock, the clock paths are all matched, and the clocks from each of the two clock sources are synchronous, the phase alignment and exact number ratio requirements are also met.

SEL is first synchronized at the falling edge of the clock, such that the AND operation will always be executed at the low level of the clock, which ensures that no glitch signal will be generated at the AND gate.

No glitch generated at the OR gate is guaranteed by the control signal generated from the control signal generation section. When SEL is toggled from low to high, such that CK1_X1 is multiplexed to the output line MCK_X1, SELB (the output of INV1) passes through to AND2 after one falling edge of CK0_X1, and the output of AND2 is low, and the output of INV3 is high. Then MP2 is off and MN2 is on and MC2 is discharged to low level after some time, and the output of INV5 is high. At the falling edge of CL1_X1, line CT1 is high and passes through to AND1. Because SEL is high and passes through to AND1, CK1_X1 is passed to the input of OR1, and CK0_X1 is stopped earlier. Thus, there is no glitch after OR1.

If CK0_X1 is stopped when the SEL toggles high, the outputs of DFF2 and DFF5 will stay high due to a lack of a clock edge, but CK0_X1 will be at a low level (this can be easily guaranteed from the clock source design and is also favorable for low leakage consideration), so that again there is no glitch. As long as CK1_X1 is active, CT1 will be high after several cycles, so that the clock will not be blocked if the other clock is stopped.

For simplicity, only two clocks from each of the two clock sources are illustrated. However if more frequency-multiplied clocks are to be multiplexed, the design can be extended with additional instances of the MUX 116 for the additional higher frequency clocks.

Figure 3:
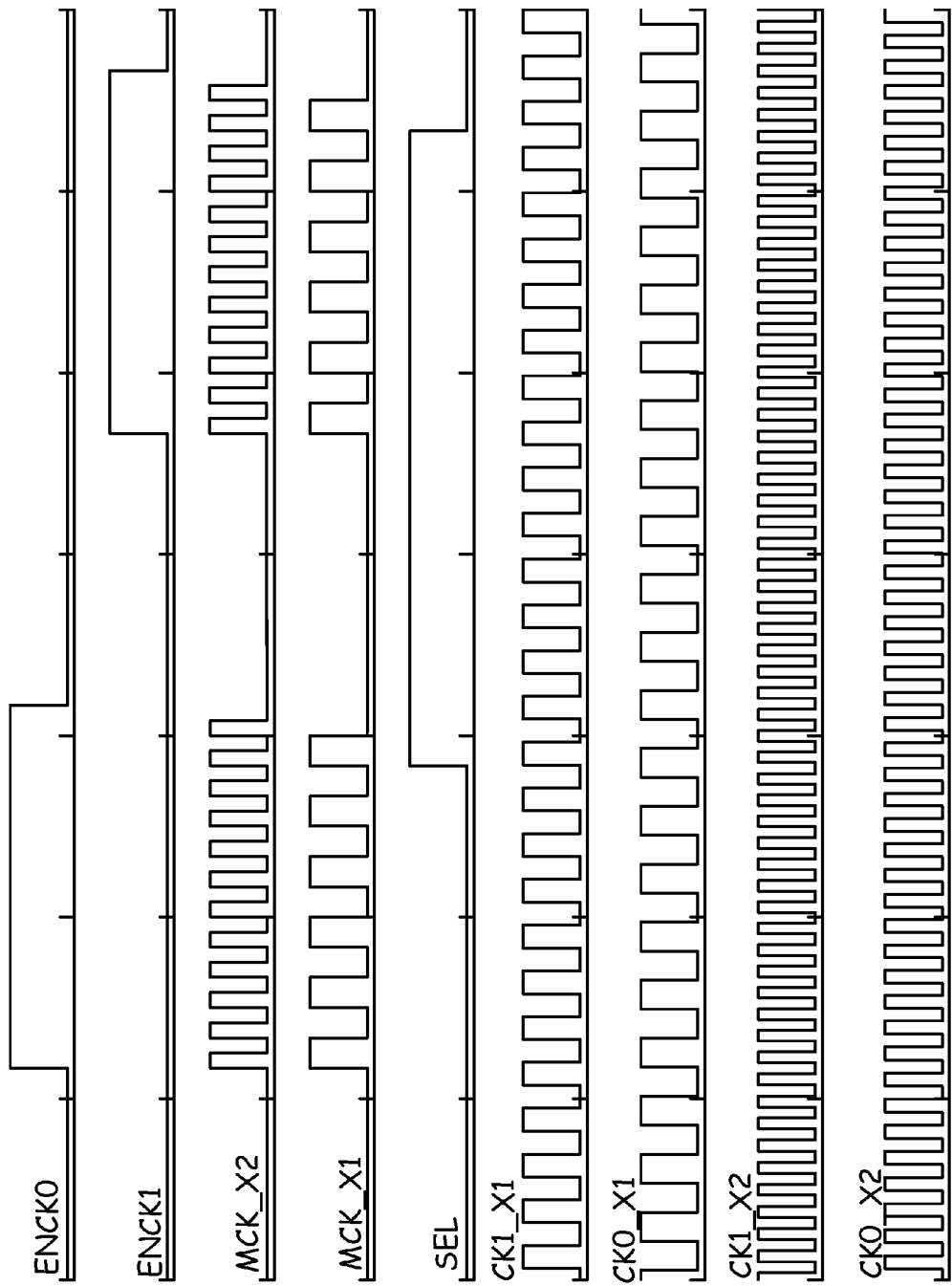
FIG. 3 is a timing diagram for the circuit of FIG. 1, according to an embodiment of the present invention.

In this embodiment, MN1/MN2 is designed to have a relatively smaller W/L ratio, so that it won't charge the gate of MC1/MC2 to a low level for the half period of the high level. This reduces the size needed for MC1/MC2. MP1/MP2 is designed to be a relatively larger W/L ratio, so that it can charge the gate of MC1/MC2 to be high for a relatively brief period of time. So if there is an active clock, the gate voltage of MC1/MC2 will always be high; otherwise, the gate voltage of MC1/MC2 will be discharged to a low level after some number off clock cycles. The size of these devices is not critical when MP1/MP2 is kept stronger than MN1/MN2. FIG. 3 depicts a representative timing diagram for this embodiment.

According to various embodiments of the present invention, a glitch-free MUX 102 is presented, which has robust performance against clock blocking when one clock source is stopped. Based on these designs, a clock source switching circuit is presented, which has the characteristics of glitch-free, phase alignment, maintaining exact pulse number ratio and cost-saving. This block can be widely used in current SERDES systems when the clock sources will be switched for working between low power mode and normal mode.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A clock-switching circuit comprising:
   a first switch, having as inputs a select line (SEL), a first relatively slower clock source (CK0_X1), a second relatively slower clock source (CK1_X1), and reset line (RESET), where the first switch (102) outputs first and second clock enable lines (ENCK0) and (ENCK1) and a first output clock line (MCK-X1) through a delay (104), and
   a second switch having as inputs a first relatively faster clock source (CK0_X2) that is a multiple of (CK1_X1), a second relatively faster clock source (CK1_X2) that is a multiple of (CK1_X1), where the two clock sources are each input through two separate delays and, the outputs of which are input to two separate AND gates, which also receive as inputs the two enable lines (ENCK0) and (ENCK1) respectively, where the outputs of the two AND gates are input to an OR gate, the output of which is a second output clock line (MCK-X2).

2. The clock-switching circuit of claim 1, wherein the first switch comprises:
   a multiplexing section having,
      a first delay flip flop (DFF1) that receives as input (SEL), (CK1_X1), and (RESET),
      a second delay flip flop (DFF2) that receives as input (SEL) through a first inverter (INV1), (CK0_X1), and (RESET),
      where (DFF1) and (DFF2) output respectively to AND gates (AND1) and (AND2), which also receive as input (CK0_X1) and (CK1_X1), respectively, and provide output to an OR gate (OR1), the output of which is (MCK-X1),
   a control signal generation section having,
      a second inverter (INV2) that receives as input the output from (AND1),
         where the output of (INV2) controls the gate electrodes of both first n-channel MOS transistor (MN)1 and first p-channel MOS transistor (MP1), the source electrode of (MP1) is VDD, the drain electrode of (MN1) is the drain electrode of a first CMOS transistor (MC1), the source electrode of (MC1) is logical ground (GND), the drain electrode of (MP1) and the source electrode of (MN1) are tied together and input to both the gate electrode of (MC1) and a fourth inverter (INV4), and
      a fifth delay flip flop (DFF5) receives as input the output of (INV4), (CK0_X1), and (RESET), and provides as output a signal (CT0),
   a third inverter (INV3) that receives as input the output from (AND2),
      where the output of (INV3) controls the gate electrodes of both second n-channel MOS transistor (MN2) and second p-channel MOS transistor (MP2), the source electrode of (MP2) is VDD, the drain electrode of (MN2) is the drain electrode of a second CMOS transistor (MC2), the source electrode of MC2 is (GND), the drain electrode of (MP2) and the source electrode of (MN2) are tied together and input to both the gate electrode of (MC2) and a fifth inverter (INV5), and
      a sixth delay flip flop (DFF6) receives as input the output of (INV5), (CK1_X1), and (RESET), and provides as output a signal (CT1), and
   an enable signal generation section having a third AND gate (AND3), which receives as input the output from (DFF1) and (CT1),
   a fourth AND gate (AND4) receives as input the output from (DFF2) and (CT0),
   a third delay flip flop receives as input the output from (AND3), (CK1_X1), and (RESET), and provides as output (ENCK1), and
   a fourth delay flip flop (DFF4) receives as input the output of (AND4), (CK0_X1), and (RESET), and provides as output (ENCK0).

* * * * *